Jan. 23, 1968  R. D. BRACKETT ET AL  3,364,835
PHOTOGRAPHIC APPARATUS AND METHOD
Filed July 12, 1965  2 Sheets-Sheet 1
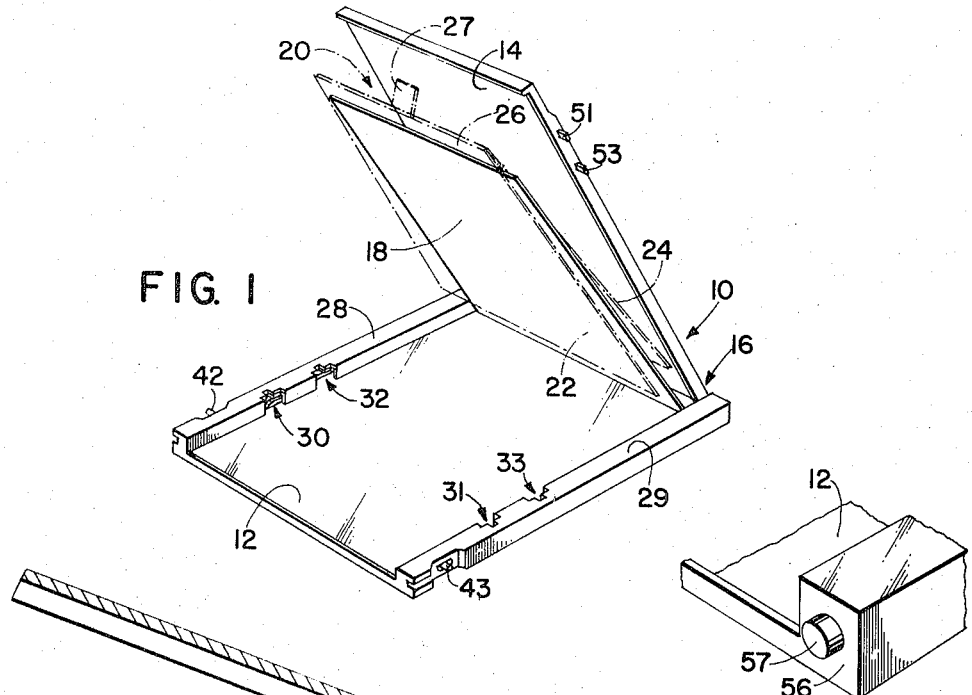
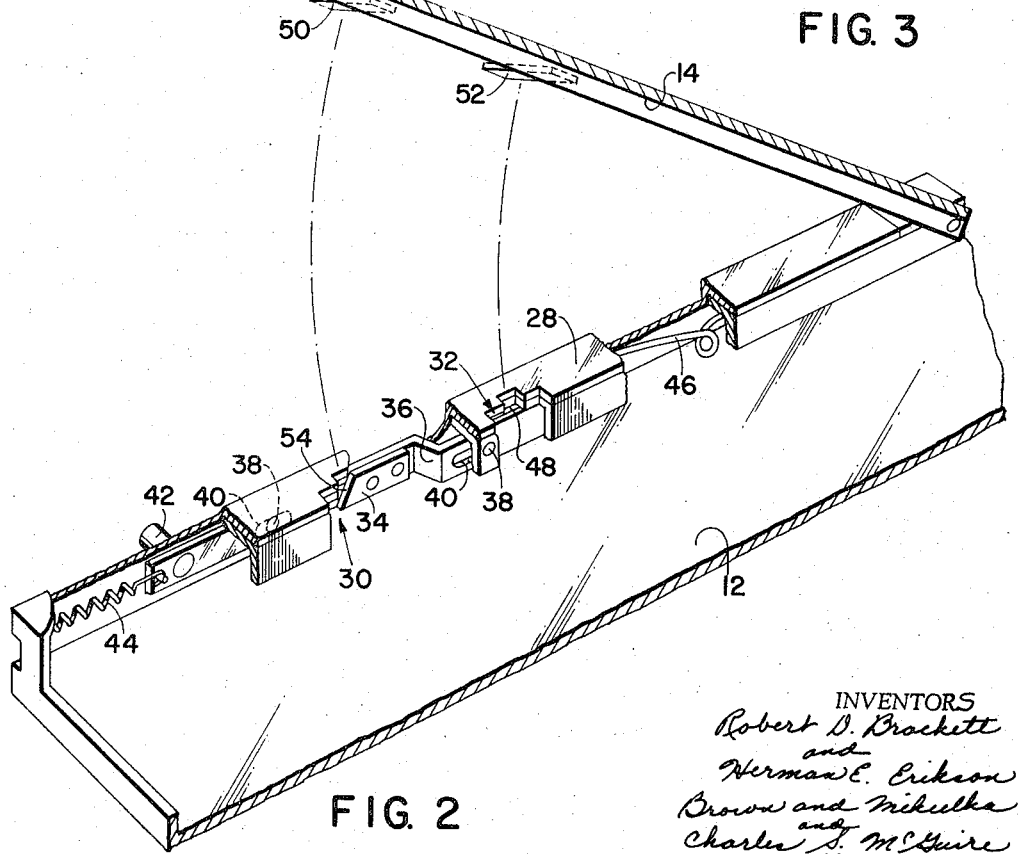
INVENTORS
Robert D. Brackett
and
Herman E. Erikson
Brown and Mikulka
and
Charles S. McGuire
ATTORNEYS Jan. 23, 1968   R. D. BRACKETT ET AL   3,364,835
PHOTOGRAPHIC APPARATUS AND METHOD
Filed July 12, 1965
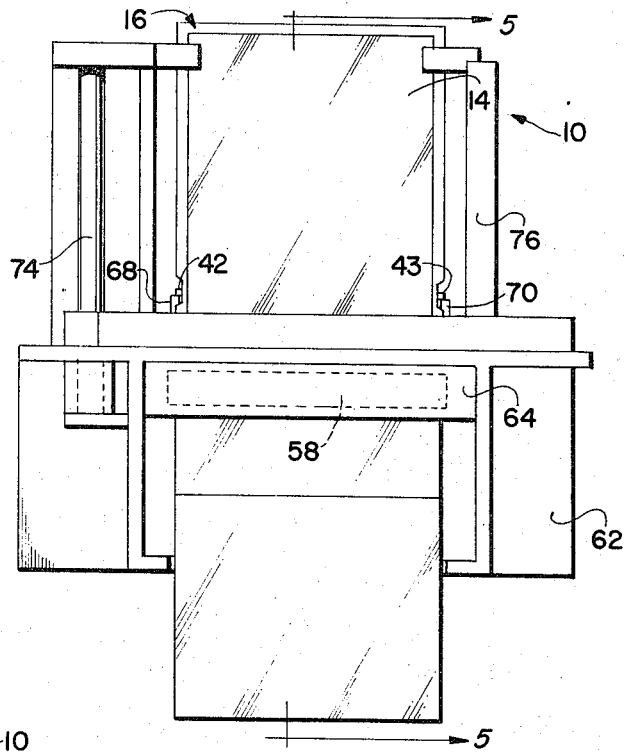
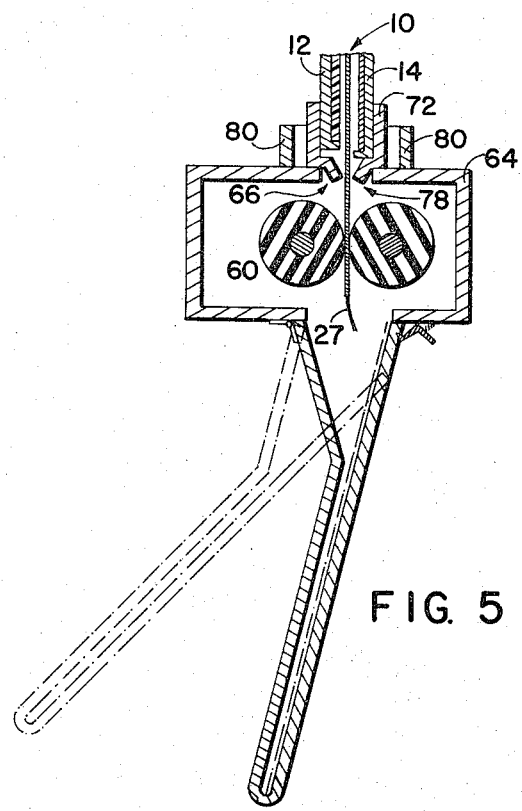
INVENTORS
Robert D. Brackett
and
Herman E. Erikson
Brown and Mikulka
and
Charles S. McGuire
ATTORNEYS

United States Patent Office 3,364,835
Patented Jan. 23, 1968

3,364,835
PHOTOGRAPHIC APPARATUS AND METHOD
Robert D. Brackett, Wakefield, and Herman E. Erikson, Winchester, Mass., assignors to Polaroid Corporation, Cambridge, Mass., a corporation of Delaware
Filed July 12, 1965, Ser. No. 471,315
1 Claim. (Cl. 95—94)

ABSTRACT OF THE DISCLOSURE

The present application relates to photographic apparatus for conducting an exposed film unit mounted in a cassette element toward a pair of enclosed pressure rolls, for removing the film unit from the cassette, and for advancing the film unit between the pressure rolls, all in the absence of actinic light. The apparatus includes latching means of the cassette serving to hold its cover at closed position, means on the cassette for releasing the latching means to open the cover and permit removal of the film unit, carriage means structurally identified with the enclosure for the pressure rolls for carrying the cassette toward the latter, and means also identified with the enclosure for the pressure rolls for contacting the latch release means of the cassette during its movement toward the pressure rolls, as provided by movement of the carriage.

---

In many photographic and radiographic applications a negative is loaded into film holding means, such as an X-ray cassette, for example, exposed in a suitable manner to form a latent image therein, and there after removed from the holding means for processing. Means must be provided for protecting the photosensitive portion of the negative from actinic light during both the loading and removal thereof. In many instances these operations are performed manually in a darkroom, although some embodiments of film units, cassettes and processing apparatus have been designed to allow daylight loading and removal within a lighttight chamber of the processing apparatus. Such film units include those of the self-developing type, for example, those commercially manufactured and sold by Polaroid Corporation of Cambridge, Mass., designated as Type 3000X and TLX Radiographic Packets and those shown in U.S. Patent No. 2,740,714 of Bachelder et al., and copending application Serial No. 471,364, now Patent No. 3,357,331, of Erikson. Cassettes suitable for daylight loading of such film units are shown in U.S. Patents Nos. 2,709,223 of Bachelder et al. and 2,726,337 of Stava et al. and in copending applications Serial Nos. 471,090 and 471,255, filed July 12, 1965 Processing apparatus of the type referred to is exemplified in U.S. Patent No. 2,638,828 of Bachelder et al.

Processing apparatus for film units of the type mentioned above generally includes a pair of rotatable pressure rolls for applying a compressive force to a pair of superposed sheets of the film unit advanced through the rolls. Thus, it has been found expedient to provide the film unit with a leading portion extending from the cassette and adapted to be frictionally engaged by the pressure rolls so that rotation thereof serves to withdraw the film unit from the cassette and advance it through the rolls. This operation may be performed in darkness, to afford the necessary protection to the photosensitive portion of the film unit, by placing the cassette within a lighttight chamber of the processing apparatus. It is first necessary, however, to relieve the pressure holding the film unit within the cassette in order to permit withdrawal of the unit by engaging and pulling on the aforementioned leading portion without tearing the latter. This in turn necessitates a manual operation on the part of the operator in moving certain portions of the cassette to effect the pressure release, as well as a cassette construction providing not only for such pressure release means, but also for effective light sealing means when the pressure within the cassette is relieved to allow film withdrawal.

The present invention is directed to a novel method and combination of apparatus which effects withdrawal of a photosensitive sheet from a cassette solely through cooperative action of the various elements involved. That is, there is no necessity for the operator to perform a manual opening or partial opening (i.e., by relieving the pressure engagement) of the cassette, with consequent advantages in simplicity of operation and construction. The film unit, or photosensitive portion thereof, is provided with a leader element extending from the cassette when the latter is retained in the closed position by releasable latch means. Gripper means are provided for engaging and advancing the leader element in a direction tending to withdraw the photosensitive sheet from the cassette. As the cassette is moved toward or by the gripper means, one or more contact elements engage the latch means on the cassette and release the latch, thus opening the cassette and allowing withdrawal therefrom of the photosensitive sheet. The cassette may be advanced manually, or by movement of the gripper means which engage the leader element of the film, into engagement of the latch means with stationary contact elements. The elements are so arranged that the photosensitive sheet is advanced out of the cassette into a lighttight environment.

The invention accordingly comprises the method involving the several steps and the relation and order of one or more of such steps with respect to each of the others and the apparatus possessing the construction, combination of elements and arrangement of parts which are exemplified in the following detailed disclosure, and the scope of the application of which is indicated in the claims.

For a fuller understanding of the nature and objects of the invention, reference should be had to the following detailed description taken in connection with the accompanying drawings wherein:

FIGURE 1 is a somewhat diagrammatic, perspective view of a cassette for holding an X-ray film unit, shown in an open position with a representative film unit shown in phantom lines;

FIG. 2 is a fragmentary, enlarged, perspective view, with portions broken away, of certain elements of the cassette of FIGURE 1;

FIG. 3 is an alternate embodiment of certain elements shown in FIG. 2;

FIG. 4 is a front elevational view of the cassette shown in cooperative relation with processing apparatus for the film unit held by the cassette; and FIG. 5 is a diagrammatic, side sectional view of the apparatus shown in FIG. 4.

Referring now to the drawings, in FIGURE 1 is shown cassette 10 of generally conventional construction comprising base member 12 and cover 14 hingedly attached for relative pivotal movement about edge 16. Base 12 and cover 14 are generally rectangular and planar in construction, preferably made of a rigid material such as a suitable metal. Means are further provided for mounting intensifying screen 18 for positioning between base 12 and cover 14, the screen being also rectangular and planar in construction so that the three elements may be moved into mutually superposed relationship when cassette 10 is in the closed position.

Cassette 10 is of the type normally used for holding a photosensitive sheet, or a film unit including such a sheet, during radiographic exposure. The film unit shown in phantom lines in FIGURE 1, and indicated generally by the reference numeral 20 is of the self-developing type, although it is to be understood that the invention is not limited solely to employment with film units of this type. In accordance with the conventional construction of such film units, a pair of liquid-confining layers or sheets 22 and 24 are hingedly attached along one edge 26 and arranged within cassette 10 on opposite sides of intensifying screen 18. Sheet 22 is provided with a photosensitive material, such as a conventional silver halide emulsion, on the surface thereof which faces sheet 24. Accordingly, it is the usual practice to provide an opaque envelope (not shown) for enclosing sheet 22 prior to loading film unit 20 into cassette 10. Further means are provided in the construction of cassettes such as those shown in the previously mentioned U.S. patents and pending applications, for effecting removal of the opaque envelope after the cassette has been moved to the closed position and thus rendered lighttight. A rupturable container (not shown) is commonly provided between the sheets of such film units adjacent hinged end 26, and is adapted to release a fluid processing composition for distribution between the sheets upon the application of a compressive force. Sheet 24 may comprise a print-carrying element so that a positive image is formed therein according to the well-known diffusion transfer process as film unit 20 is processed through the action of the liquid composition distributed by the sheets. Leader element 27 is affixed to film unit 20 to extend outside cassette 10, forwardly of the leading edge thereof (i.e., the edge opposite hinged edge 16) when the cassette is closed.

In FIG. 2 is shown a fragment of side portion 28 of base 12. Side portion or member 28 includes wall members defining a hollow, enclosed space along one side of the base and a similar side member 29 including the same element enclosed within the hollow space defined by the wall members, as described hereinafter, is provided along the other side. It will be understood, therefore, that all descriptive matter pertaining to side member 28 and elements associated therewith, are duplicated on the other side of base member 12. Openings 30 and 32 are formed in appropriate portions of the wall members of side member 28, and a similar pair of openings 31 and 33 are provided in side member 29. Latch plate 34 is attached to slide 36 which is mounted for reciprocal, sliding movement between forward and rearward positions with respect to the leading edge of cassette 10. Appropriate means such as rivets 38 extending from side portion 28 through elongated slots 40 in slide 36 provide suitable mounting means for limiting the extent of forward and rearward travel of slide 36. Latch release button 42 extends from a forward end of slide 36 through an elongated opening in side member 28 and outwardly from the side of cassette 10. Latch release button 43 extends outwardly in a similar manner from side member 29. Spring 44 is provided for biasing slide 36, and thereby latch plate 34 toward the forward position.

Torsion spring 46 is provided within the hollow enclosure of side portion 28 and includes portion 48 extending across opening 32. Spring 46 is so arranged within side member 28 that portion 48 is urged upwardly, i.e., into contact with the inner surface of the upper wall of side portion 28.

Cover 14 is provided with a pair of fixed pins 50 and 52 extending outwardly from one side thereof and with a similar set of pins 51 and 53 on the opposite side. Pins 50 and 52 are arranged to pass into openings 30 and 32, respectively, as cassette 10 is moved to the closed position, wherein the side edges of cover 14 lie between side members 28 and 29 of base 12. As the cover and base are moved together, pin 50 will contact sloping surface 54 of latch plate 30 and continued movement will cam the latch plate and slide 36 toward the rearward position, against the bias of spring 44. After pin 50 has been moved past the lower edge of latch plate 34, spring 44 will return slide 36 and latch plate 34 to the forward position, thereby engaging pin 50 and holding cover 14 and base 12 in superposed relation, i.e., the closed position of cassette 10.

In FIG. 3 is shown a slightly different embodiment of the latch release means. In this embodiment the latch plate and slide may be mounted in the same manner within a side portion of the base of the cassette and coact in the same manner with a pin on the cover. However, rather than providing a latch release button extending outwardly from the side member, an opening is provided in forward wall 56 thereof. A portion of the latch slide, or means connected thereto, is positioned behind the opening in wall 56, or may extend forwardly through the opening, or flush with the surface of front wall 56. It may be seen that rearward movement of latch release button 42, in the FIG. 2 embodiment, or with portion 57 of the latch slide in registration with the opening in wall portion 56, in the case of the FIG. 3 embodiment, will be effective to move the slide and latch plate to the rearward position, against the bias of spring 44, and out of engagement with pin 50 of cover 14, thus permitting movement of the said pin to the open position.

Pin 52 is positioned in registration with opening 32 for contact with portion 48 of spring 46 when the cassette is moved to the closed position. Spring 46 is thereby flexed away from its initial position across opening 32 and exerts a force on pin 52 tending to move base 12 and cover 14 apart. When latch plate 34 is released from engagement with pin 50 in the above described manner, spring 46 will thus serve to begin opening movement of cassette 10.

In FIGS. 4 and 5, cassette 10 is shown in front and side views, respectively, in proximity to a pair of pressure rolls 58 and 60, such as those commonly used in processing apparatus for film units of the self-developing type. Rolls 58 and 60 are rotatably mounted and suitable drive means, indicated diagrammatically by the reference numeral 62, are provided for imparting rotation thereto. Drive means 62 may comprise, for example, an electric or spring powered motor. If desired, means may be provided to allow lateral relative movement of rolls 58 and 60 toward and away from one another, as well as rotational movement. Leader element 27, extending outside cassette 10 from the leading edge thereof as previously described, is directed toward engagement by the rolls 58 and 60, by proper manual arrangement of cassette 10.

Rolls 58 and 60 are contained within lighttight housing means 64 which includes elongated opening 66 positioned in registration with the bite of the rolls. Opening 66 is of substantially the same width as film unit 20 and is adapted to form a lighttight seal with the leading edge of cassette 10 when the latter is positioned for engagement of leader element 27 between rolls 58 and 60. Stationary contact members 68 and 70 extend outwardly from housing means 64 in position for engagement with latch release buttons 42 and 43 on opposite sides of cassette 10. As cassette 10 is moved toward rolls 58 and 60, fingers 68 and 70 will effect rearward movement with respect to the cassette of the latch release members thereon, thus effecting release of the cassette from the closed position.

Although cassette 10 may be positioned with the leading edge thereof in direct, lighttight engagement with housing means 64, as indicated above, additional means may be provided for positioning the cassette and advancing it with respect to the stationary contact members and pressure rolls. Such means are shown in FIGS. 4 and 5 as comprising movable carriage 72 mounted for reciprocal, sliding movement toward and away from opening 66 on fixed guide members 74 and 76. Carriage 72 includes a surface adapted to have positioned thereon the leading edge of cassette 10 with leader element 27 extending through opening 78, of like size and in registration with opening 66. Rectangular wall member 80 extends outwardly from housing means 64 in encircling relation to opening 66 and is adapted to accommodate therewithin at least a portion of carriage 72. As best seen in the sectional view of FIG. 5, when movable carriage 72 is moved into engagement with housing means 64, leader element 27 extends through both openings 66 and 78 and is positioned for engagement between rolls 58 and 60. Advancement of leader element 27, and thereby film unit 20, will be effective to withdraw the film unit from cassette 10 since the latter has now been opened by engagement of contact members 68 and 70 with latch release buttons 42 and 43. The cooperative arrangement of carriage 72 and wall member 80 insures a lighttight path for the travel of film unit 20 from cassette 10 into housing means 64.

In effecting release of the cassette closure means to allow opening movement thereof and withdrawal of the film unit the cassette may be manually advanced toward the pressure rolls while the latter are rotating. Such manual advancement will open the cassette a sufficient amount to allow withdrawal of the film unit by advancement of the latch release means into engagement with the stationary contact members; withdrawal of the film unit will be effected by engagement of leader element 27 between the rotating pressure rolls. Alternatively, the cassette 10 may be positioned with the latch release elements in proximity to the stationary contact members and leader element 27 placed between rolls 58 and 60 before rotation is imparted thereto. The entire cassette will then be moved toward the rolls when the latter are rotated through advancement of leader element 27 of the film unit before cassette 10 is opened. Such advancement will cause the contact members to effect release of the cassette closure means in the same manner as the previously described manual movement. It is further possible, within the scope of the invention, to provide means for engaging and advancing leader element 27 in a manner other than by rotation of a pair of rolls. Such means could be used, for example, in removing single negative sheets or film units of other than the self-developing type from cassettes. The roll method of removal is preferred for self-developing film units since, in addition to withdrawal of the film unit from the cassette, the rolls may also effect distribution of the processing liquid between the sheets of film unit in accordance with the usual practice.

Since certain changes may be made in the above method and apparatus without departing from the scope of the invention herein involved, it is intended that all matter contained in the above description or shown in the accompanying drawings shall be interpreted as illustrative and not in a limiting sense.

What is claimed is:

1. Processing apparatus for a photographic film unit of the self-developing type which is held in a closed cassette with a leader member extending outside and in advance of a leading edge of said cassette and adapted to be processed by withdrawal from said cassette and advancement between a pair of pressure-applying members, said apparatus comprising, in combination:
    (a) a pair of rotatably mounted juxtaposed pressure rolls;
    (b) drive means adapted to impart rotation to said rolls;
    (c) positioning means located adjacent the film input side of said rolls comprising a movable carriage mounted upon fixed guide members for allowing movement of said cassette toward and away from said rolls; and
    (d) cassette opening means comprising at least one stationary finger positioned adjacent said input side and in the path of movement of a latch release member of said cassette adapted to effect release of latch means holding the cassette in a closed condition, thereby allowing said cassette to open and said film unit to be withdrawn therefrom.

References Cited

UNITED STATES PATENTS

| | | | |
|---|---|---|---|
| 2,689,306 | 9/1954 | Land | 95—89 |
| 2,878,389 | 3/1959 | Raffman | 250—66 XR |
| 3,150,263 | 9/1964 | Catlin | 250—66 |
| 3,271,571 | 9/1966 | Klem et al. | 95—89 XR |
| 3,286,092 | 11/1966 | Sames | 250—66 XR |
| 3,316,823 | 5/1967 | Kaess et al. | 95—1 |

NORTON ANSHER, *Primary Examiner.*

F. L. BRAUN, *Assistant Examiner.*